2,950,280
SUBSTITUTED BENZENESULFONYL-HYDRAZONES (J)

Hans Willi Zimmer, Cincinnati, Ohio, assignor to The Chattanooga Medicine Company, Chattanooga, Tenn., a corporation of Tennessee No Drawing. Filed July 1, 1958, Ser. No. 745,835

4 Claims. (Cl. 260—239.6)

The instant invention relates to novel organic compounds, and more particularly, to novel substituted benzenesulfonylhydrazones.

Although the compounds of the invention may have a number of uses in various fields, they may be found to be particularly useful as sun screen agents, foaming agents and chemotherapeutic agents. A desirable ingredient for "sun tan" lotions is a sun screen agent with high absorption of ultraviolet radiation in the neighborhood 2970 A. (which wavelength produces undesirable reddening effect on the skin) and low absorption of light radiation in the neighborhood of 3400 A. (which wavelength produces the maximum tanning effect). The instant compounds possess such absorption spectral characteristics.

Also, the instant compounds may undergo decomposition upon melting and such decomposition is accompanied by the evolution of a large volume of gas, so that these compounds may be added to molten plastic or synthetic resin materials to act as foaming agents therefor.

In addition, the compounds of the invention may display anti-bacterial activity comparable to that of the well known sulfa drugs, sulfanilamide and sulfadiazine. In this respect, it should be noted that certain bacteria such as *Streptococcus pyogenes, Micrococcus pyogenes,* and *Escherichia coli* tend to become resistant to the known sulfa drugs, although they may be particularly sensitive to a new sulfa compound. It is believed that exposure of such bacteria to known sulfa drugs often tends to result in the survival of a strain resistant to such sulfa drugs, but still sensitive to a new sulfa drug to which the strain has not yet been exposed. There is thus a great need for new compounds which display antibacterial activity.

It is, therefore, an important object of the instant invention to provide new and useful substituted benzenesulfonylhydrazones.

It is another object of the instant invention to provide new and useful acetamido-, nitro- or amino-benzenesulfonylhydrazones of certain heterocyclic aldehydes or ketones.

Yet another object of the instant invention is to provide new compounds useful as sun screen agents, foaming agents and/or chemotherapeutic agents.

Other and further objects, feature and advantages of the present invention will become apparent to those skilled in the art from the following detailed disclosure thereof.

The instant invention consists in the compound having the formula:

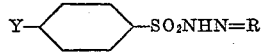

wherein Y is a monovalent radical selected from the class consisting of $-NO_2$, $-NH_2$, and $-NHCOCH_3$ and R is heterocyclic radical containing at least one heterocyclic ring containing five to six nuclear atoms of which one to three are atoms selected from the class consisting of S and N.

As indicated, the radical Y may be $-NO_2$, $-NH_2$, or $-NHCOCH_3$, so that the instant compounds are p-nitrobenzenesulfonylhydrazones, p - aminobenzenesulfonylhydrazones, or p-acetamidobenzenesulfonylhydrazones, of higher aldehydes or ketones.

In each case, these are aldehydes or ketones containing at least one heterocyclic ring, which is formed of five to six nuclear atoms of which one to three are S and/or N atoms, and the remainder are C's. In the heterocyclic nucleus there preferably are at least two C's with the remainder being atoms of the class: S, N and O (at least one of such atoms necessarily being S or N). Preferably, the heterocyclic ring is a five membered ring containing one to two unsaturated double bonds (in the nuclear structure) and only one S or N atom.

In addition to the heterocyclic ring, the radical R may contain aliphatic groups. One aliphatic group is preferably a "linking" $C_1$—$C_6$ hydrocarbon group connecting the heterocyclic ring with the hydrazine N. Other groups such as the phenyl group may be attached to this linking group. Also, the radical R may contain still other carbocyclic rings and aliphatic groups. For example, phenyl groups may be included as individual rings or conjugated with the heterocyclic ring. Up to three $C_1$—$C_4$ alkyl groups may be connected to nuclear atoms in rings in the radical R. The radical R may contain from 2 to 18 C's, 1 to 2 O's, 1 to 3 S's, and 1 to 3 N's. Preferably, R contains a total of 1 to 2 rings (conjugated or separate).

Typical compounds of the invention include the following:

p-nitrobenzenesulfonylhydrazone of 2-acetylthiophene:

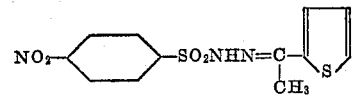

p-nitrobenzenesulfonylhydrazone of 2-acetyl-1,3-thiazole:

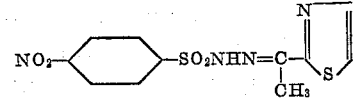

p-nitrobenzenesulfonylhydrazone of 2-acetyl-1,3,4-thiodiazole:

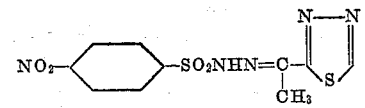

p-nitrobenzenesulfonylhydrazone of 2-acetylpyrrole:

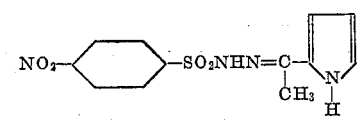

p-nitrobenzenesulfonylhydrazone of 2-acetyl-1,3-benzodiazole:

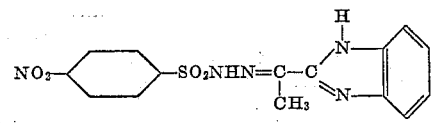

p-nitrobenzenesulfonylhydrazone of 3 - acetylthianaphthene:

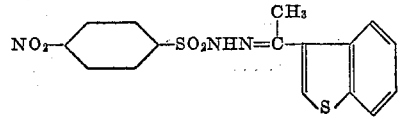

p-nitrobenzenesulfonylhydrazone of thienyl phenyl ketone:

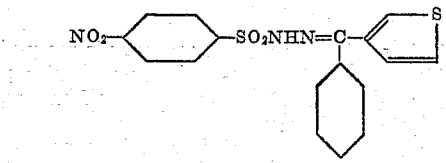

p-nitrobenzenesulfonylhydrazone of 2-acetyl-4-methyl-1,3-thiazoline:

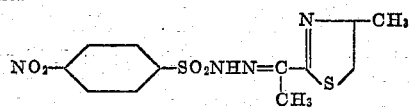

p-nitrobenezenesulfonylhydrazone of 2-acetyl-4-phenyl-1,3-thiazolidine:

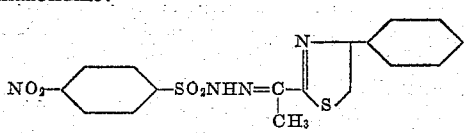

p-nitrobenzenesulfonylhydrazone of 2-acetyl-1,3-benzoxazole:

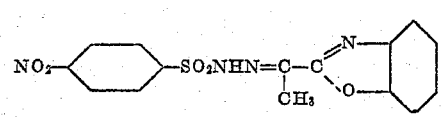

p-aminobenezenesulfonylhydrazone of 2-acetylthiophene:

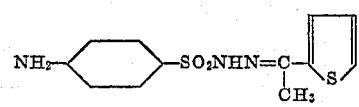

p-aminobenezenesulfonylhydrazone of 2-acetyl-5-methylthiophene:

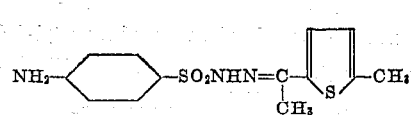

p-aminobenzenesulfonylhydrazone of 2-propionyl-1,3-oxazole:

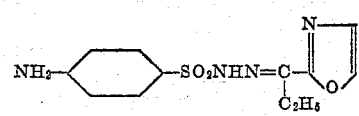

p-aminobenezenesulfonylhydrazone of 2-acetyl-1,3-benzothiazole:

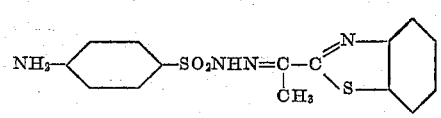

p-aminobenzenesulfonylhydrazone of 2-acetyl-4-phenyl-1,3-thiazolidine:

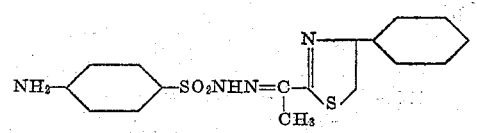

p-aminobenezenesulfonylhydrazone of 2-acetyl-3-methylpyrrole:

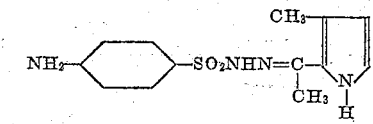

p-acetamidobenzenesulfonylhydrazone of 3-acetylthianaphthene:

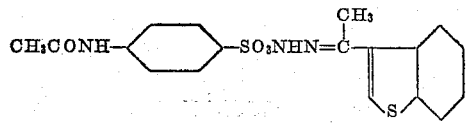

p-acetamidobenzenesulfonylhydrazone of 2-acetylthiophene:

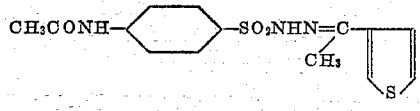

p-acetamidobenzenesulfonylhydrazone of 2-acetylbenzothioxole:

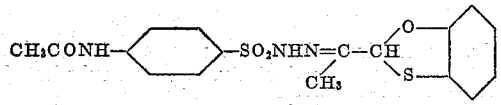

p-acetamidobenzenesulfonylhydrazone of 2-acetyl-5-ethylpyrrole:

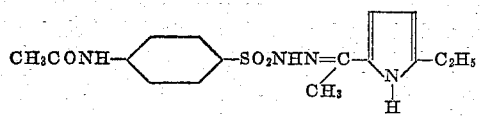

p-acetamidobenzenesulfonylhydrazone of 2-acetylthiophane:

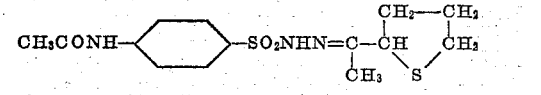

p-nitrobenzenesulfonylhydrazone of 2-acetyl-1,3-oxazine:

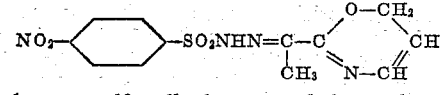

p-aminobenzenesulfonylhydrazone of 2-acetyl pyridine:

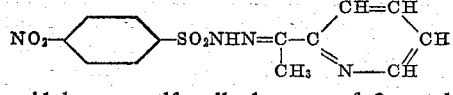

p-acetamidobenzenesulfonylhydrazone of 2-acetyl metathiazine:

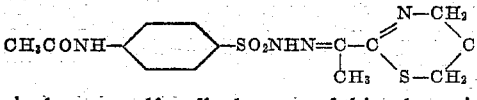

p-aminobenzenesulfonylhydrazone of thienyl propionaldehyde:

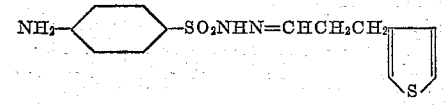

The compounds of the instant invention are prepared by reacting the aldehyde or ketone with the substituted benezenesulfonylhydrazine desired. This may be the p-aminobenzenesulfonylhydrazine, p-acetamidobenzenesulfonylhydrazine, or p-nitrobenzenesulfonylhydrazine. The reaction is carried out advantageously in a solvent; and the solvents preferred for use are water, alcohol, dioxane or mixtures thereof. The instant hydrazines are relatively insoluble in the solvents; and the reaction is facilitated by the application of external heat and stirring. The selected hydrazine is first placed in the solvent and heat is applied with stirring, so as to obtain a solution or a slurry; then substantially and equal molar quantity of the aldehyde or ketone is added, preferably a small amount at a time with stirring, until the reaction is completed, as evidenced by a homogeneous appearance of the reaction mixture. The entire reaction period is but a few minutes (for example, 5 to 10 minutes). The product separates from the reaction mixture on cooling to room temperature and may be easily separated therefrom; and the product may be re-crystallized from alcohol, water, dioxane or a mixture thereof to yield a relatively pure product.

Example 1 p-Nitrobenzenesulfonylhydrazine (0.025 mol) is slurried, with stirring, in 50 ml. of warm methanol. 2-acetylthiophene (0.025 mol) is added dropwise with stirring. Afer the reaction mixture becomes homogeneous, 20 ml. of water is added. The reaction mixture is allowed to stand overnight and then the crystals which have separated out are collected on a suction filter and dried in an oven at 95° C. The product is a yellow-tan crystalline material (91% yield), melting with decomposition at 160–164° C. This product is re-crystallized from 100 ml. of hot methanol, to obtain a yield of 53% of yellow crystals which melt with decomposition at 166.5–168° C. Analysis for p-nitrobenzenesulfonylhydrazone of 2-acetylthiophene: calculated for $C_{12}H_{12}N_3O_4S_2$ is $C=44.29$, $H=3.41$, $N=12.91$; and found: $C=44.37$, $H=3.19$, $N=12.66$.

Each of the other nitro-substituted benzenesulfonylhydrazones of the instant invention is prepared by carrying out the foregoing procedure using the specific aldehyde or ketone selected in place of the 2-acetylthiophene specified in the procedure of the foregoing paragraph.

Example 2 p-Aminobenzenesulfonylhydrazine (0.027 mol) is dissolved in 100 ml. of hot methanol to which a few drops of water have been added. 2-acetylthiophene (0.027 mol) is added with stirring, and the reaction mixture is permitted to cool to room temperature. The crystals precipitated from the reaction mixture upon cooling are collected on a suction filter and dried at 95° C. in an oven. These crystals are re-crystallized from hot methanol to which a little water has been added, to obtain a white crystalline product melting with decomposition at 205.5–206.5° C. Analysis for p-aminobenzenesulfonylhydrazone of 2-acetylthiophene calculated for $C_{12}H_{13}N_3O_2S_2$ is $C=48.79$, $H=4.43$, $N=14.22$; and found: $C=48.48$, $H=4.35$, $N=14.02$.

p-Aminobenzenesulfonylhydrazones of other aldehydes or ketones such as 2 - acetyl-5-methylthiophene, 2-propionyl-1,3 - oxazole, 2-acetyl-1,3-benzothiazole, 2-acetyl-3-methylpyrrole, and thienyl propionaldehyde are prepared by substituting the selected aldehyde or ketone in place of the 2-acetylthiophene in the procedure described in the foregoing paragraph.

Example 3 p-Acetamidobenzenesulfonylhydrazine (0.04 mol) is dissolved in 500 ml. of hot water (at 80° C.). 3-acetylthianaphthene (0.04 mol) is added to the hot water solution, with vigorous stirring, and such stirring is continued as the solution cools to room temperature. During this cooling period, crystals begin separating from the reaction mixture. After two hours, the crystals are collected on a suction filter and dried in an oven at 95° C. The product is re-crystallized from a mixture of three parts of methanol and two parts of water, to obtain a substantially pure product in the form of white crystals melting with decomposition at 224–225° C. Analysis for p-acetamidobenzenesulfonylhydrazone of 3-acetylthianaphthene: calculated for $C_{18}H_{17}N_3O_3S_2$ is $C=55.78$, $H=4.42$, $N=10.84$; and found $C=55.92$, $H=4.41$, $N=10.60$.

The p-acetamidobenzenesulfonylhydrazone of other aldehydes and ketones, such as 2-acetylthiophene, 2-acetylbenzothioxole, 2-acetyl-5-ethylpyrrole and 2-acetylthiophane, are prepared by substituting the selected aldehyde or ketone for the 3-acetylthianaphthene employed in the procedure of the foregoing paragraph.

The compounds of the invention just described show peak absorptions of light radiation in the neighborhood of 2970 A. and low absorption of light radiation in the neighborhood of 3400 A., so that they may be used in sun tan lotions. These compounds also undergo decomposition upon melting so that they may be used as foaming agents.

It will be understood that modifications and variations may be effected without departing from the spirit and scope of the novel concepts of the present invention.

I claim as my invention:

1. A compound having the following formula:

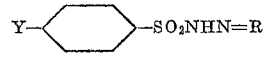

wherein Y is a monovalent radical selected from the class consisting of —$NO_2$, —$NH_2$, and —$NHCOCH_3$ and R is heterocyclic radicals consisting of (a) one heterocyclic ring containing five nuclear atoms of which one to three are atoms selected from the class consisting of S and N, (b) not more than one phenyl ring, (c) one trivalent aliphatic $C_1$–$C_6$ saturated hydrocarbon group connected to a nuclear carbon atom and the hydrazine N, and (d) not more than three $C_1$–$C_4$ alkyl groups connected to nuclear atoms, the radical R containing only hydrogen atoms, from 2 to 18 carbon atoms, up to one oxygen atom, up to one sulfur atom and up to two nitrogen atoms.

2. p-Acetamidobenzenesulfonylhydrazone of 3-acetylthianaphthene.

3. p-Aminobenzenesulfonylhydrazone of 2-acetylthiophene.

4. p - Nitrobenzenesulfonylhydrazone of 2 - acetylthiophene.

References Cited in the file of this patent

UNITED STATES PATENTS 2,171,159    McNally et al. _____ Aug. 29, 1939

OTHER REFERENCES

Richter: The Chemistry of the Carbon Compounds, vol. IV, Elsevier, New York, pp. 14–15 (1947).

Lehman et al.: Bull. Soc. Chim. Belges, vol. 55, pp. 84 and 91 to 92 (1946).